March 19, 1963  K. BAUER ET AL  3,082,259
PROCESS FOR OBTAINING PURE TRIMETHYLOLPROPANE
Filed Nov. 22, 1955
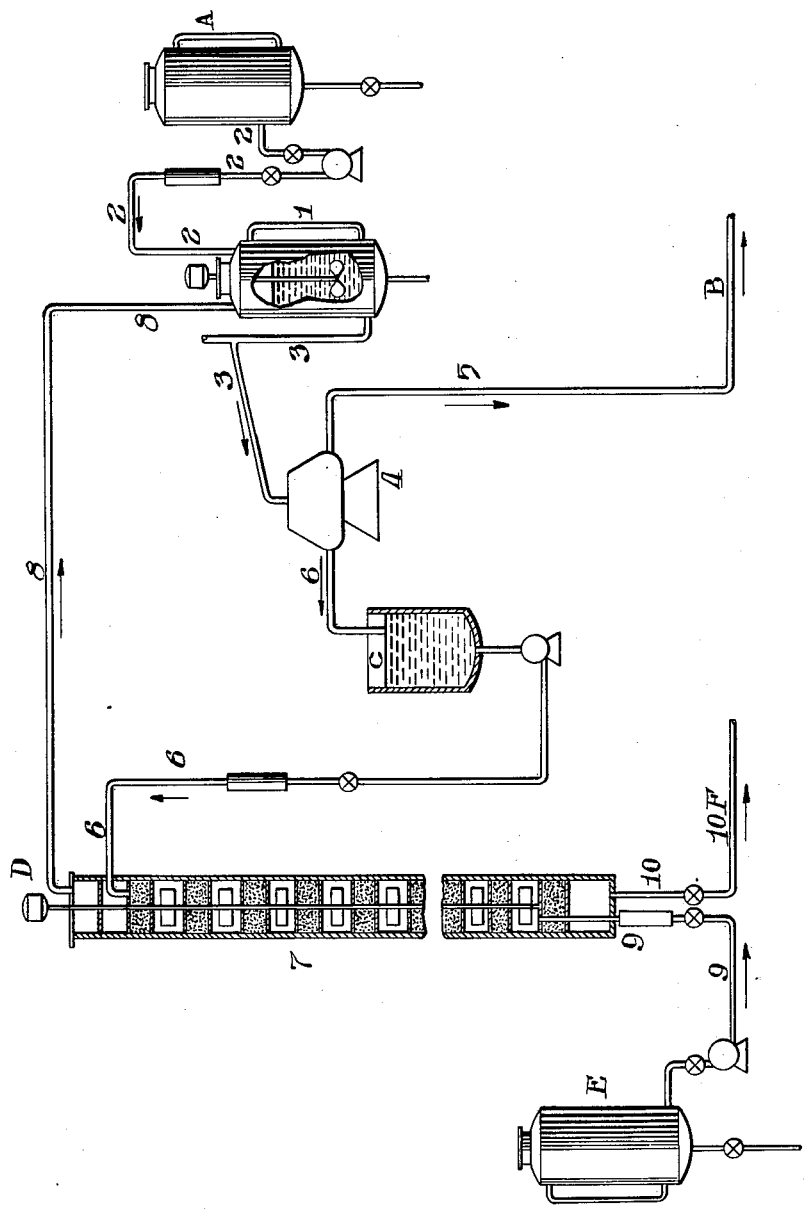
INVENTORS
Kurt Bauer
Harry Danziger
Gottfried Schulze
BY
Connolly and Hutz
ATTORNEYS

3,082,259
PROCESS FOR OBTAINING PURE TRIMETHYLOLPROPANE
Kurt Bauer, Holzminden, Harry Danziger, Krefeld, and Gottfried Schulze, Krefeld-Uerdingen, Germany; Eleonore Bertha Katharina Schulze, nee Woiczinski, legal heiress of said Gottfried Schulze, deceased, assignors to Farbenfabriken Bayer Aktiengesellschaft, Leverkusen, Germany, a corporation of Germany
Filed Nov. 22, 1955, Ser. No. 548,489
Claims priority, application Germany Nov. 23, 1954
1 Claim. (Cl. 260—637)

The present invention relates to a process for obtaining pure trimethylol-propane by condensation of butyraldehyde with formaldehyde in the presence of water and a basic compound. More particularly, it comprises an improved process for obtaining pure trimethylolpropane from the crude reaction mixture. The invention is also concerned with a device for carrying out the improved process.

In the known condensation of butyraldehyde with formaldehyde to trimethylolpropane in the presence of water and a basic compound (chiefly alkaline earth metal hydroxides, preferably calcium hydroxide), a reaction mixture is obtained in the processing of which, difficulty is encountered due to the salt content, particularly alkaline earth metal formate (calcium formate) on the one hand, and organic by-products on the other hand. Thus, the aforesaid impurities with the trimethylolpropane impede the production of pure trimethylolpropane by distillation.

It has already been proposed to extract trimethylolpropane from a concentrated solution with, for example, methylacetate, obtained by filtering off the exess calcium hydroxide and possibly calcium sulphate separated out after neutralizing the reaction mixture with sulphuric acid, and to crystallize out trimethylolpropane from the extract. In practice, only the distillation of trimethylolpropane from the crude reaction mixture has hitherto been used in spite of the fact that a rather impure product is obtained. It is also contaminated by acetals, esters and high molecular weight compounds. Such a distilled trimethylolpropane may be further purified by known processes comprising for instance heating it for a prolonged time, say 60 hours, if desired with co-application of water or steam, to a temperature of about 120° C. in such a manner that the pure trimethylolpropane is not decomposed and not distilled off, or by treating trimethylolpropane with a low boiling alcohol at an elevated temperature so that the volatile products initially present or formed are continuously distilled off. These processes although cumbersome substantially improve the purity of trimethylolpropane but do not ensure an entirely pure product. The main disadvantages of the known processes are that substantial quantities of water must be evaporated which involves much heat, and that great amounts of solids, mainly alkali metal or calcium salts, must be removed by repeated filtration.

Since it is known that, for example glycerol or other polyhydric alcohols can be extracted from aqueous, preferably salt-containing, solutions by partially water-miscible alcohols, it was to be expected that such an extraction could also be applied to the production of pure trimethylolpropane from aqueous mixtures obtained by condensation of butyraldheyde with formaldehyde. This process is, however, doomed to failure since the organic by-products initially present as impurities in the starting mixture are extracted together with trimethylolpropane and the production of pure trimethylolpropane by distillation is difficult to achieve. Even a very careful distillation from such a solution yields, after evaporation of the solvent, only a portion of satisfactorily pure trimethylolpropane. A residue is left behind which contains substantial quantities of trimethylolpropane, being decomposed to a significant extent upon distillation. The loss of these quantities of reaction product renders the process uneconomical.

According to the present invention, we have found that pure trimethylolpropane can be produced in a technically advantageous manner in high yield from the reaction mixture obtained by alkaline condensation of butyraldehyde with formaldehyde before or after separation of the inorganic constituents, and, if desired, after distilling off the bulk of trimethylolpropane, by distributing trimethylolpropane and the organic impurities between an only partially water-miscible solvent which selectively dissolves polyhydric alcohols, and water.

This process is based on the discovery that the impurities dissolve more readily in the aforesaid solvents than does trimethylolpropane itself.

One method of carrying out the process according to the invention comprises treating the mixture obtained in the condensation immediately with a small quantity of such a solvent. In this way, all organic impurities and only a small quantity of trimethylolpropane are practically extracted, while trimethylolpropane essentially remains in the aqueous phase. The small quantity of trimethylolpropane can then be recovered from the extract by washing with water or with a trimethylolpropane free raffinate obtained at the end of the working process. The bulk of trihydric alcohol can then be obtained from the aqueous trimethylolpropane solution in a pure state in a second step of the process by treating it with a greater quantity of the same solvent or a similar solvent and by subsequent distillation, after washing the extract with water or with trimethylolpropane saturated water if desired.

In another method of carrying out the process according to the invention, trimethylolpropane and the organic impurities can first be extracted from the aqueous condensation solution by a sufficient quantity of a solvent of the aforesaid kind. The extract is then concentrated by distilling off the bulk of solvent and treated with water or trimethylolpropane free raffinate. The organic impurities are left in the organic solvent, while trimethylolpropane is dissolved in the aqueous phase. Trimethylolpropane can then again be extracted with sufficient of the same or a similar solvent and trimethylolpropane can be optained in a pure state by distillation, after washing the extract with water or trimethylolpropane saturated water if desired.

According to a modification of the last-mentioned method, the extraction of trimethylolpropane from the concentrated crude extract with water or an aqueous salt solution as well as from the aqueous solution by another application of an organic solvent can be avoided, and the process can be simplified by immediately separating the bulk of the trimethylolpropane from the crude extract by careful distillation for example with the aid of a film evaporator, after complete evaporation of the solvent. In that even only the residue containing the remaining quantity of trimethylolpropane need be worked up. According to one embodiment of the invention, this is carried out by distributing the residue between water or trimethylolpropane free raffinate and a small quantity of an organic solvent, whereupon only the organic impurities appreciably dissolve in the organic solvent, whilst trimethylolpropane dissolves preferentially in the aqueous phase. Trimethylolpropane can then be extracted from this phase by a greater quantity of the same or a similar solvent. The aqueous phase still containing trimethylolpropane is expediently re-used for the first extraction.

The accompanying drawing illustrates diagrammatically an apparatus for carrying out the process.

As shown in the drawing, the apparatus includes a mixer 1 with a feed inlet 2 for the starting mixture A and a discharge outlet 3 connecting the mixer 1 with a separator 4, said separator 4 being provided with a discharge outlet 5 for the final extract B and a discharge outlet 6 for the preliminary raffinate C leading to the upper end of a multi-stage extraction column 7 which in turn is also connected at the upper end with the mixer 1 by a pipe 8 for the preliminary extract D and provided at the lower end with a feed 9 for the solvent E and a discharge 10 for the final raffinate F.

The mixture A to be treated, for example a mixture obtained by condensation of butyraldehyde with formaldehyde and containing trimethylolpropane, salts, organic impurities and water is fed from the storage tank through pipe 2 to the mixer 1 which is fed at the same time through pipe 8 with the preliminary extract D from the extraction column 7. The two liquids are mixed together and enter the separator 4 through line 3. There a separation occurs into two liquid phases one of which comprises the final extract B, for example a solution of trimethylolpropane in cyclohexanol, withdrawn from the mixer through pipe 5, and the other the preliminary raffinate C fed via pipe 6 to the multi-stage extraction column 7 at the upper end, while at the same time solvent E, for example cyclohexanol, is continuously introduced from a storage tank through pipe 9 into the lower end of this extraction column and at the end of the final raffinate F, for example an aqueous salt solution, is continuously discharged through line 10. The extraction takes place in the column in usual manner but with the exception that the liquid mixture feed and the final extract is not introduced at, and discharged from, the one end of the column but that at the top end of the column a preliminary extract is discharged which passes together with the liquid mixture feed through a separator where the barely separable liquids are divided into the final extract and a preliminary raffinate and said preliminary raffinate instead of the starting mixture is fed to the column. The directions of flow of solvent and raffinate may be the reverse of those described in this case.

Selective partially water-miscible solvents suitable for polyhydric alcohols according to the invention are particularly monohydric, aliphatic, cycloaliphatic and araliphatic alcohols of 4–8 carbon atoms, for example butanol, iso-octanol, cyclohexanol, methylcyclohexanol, or benzylalcohol or mixtures of these alcohols. It is to be understood that different solvents may be used for the different extraction steps. In general, it is however advantageous to use always the same solvent or solvent mixture.

The following examples are given for the purpose of illustrating the invention, the parts being parts by weight.

*Example 1*

2000 parts by weight of 94 percent butyraldehyde are condensed with 8200 parts by weight of a 30 percent formaldehyde solution in the presence of 2130 parts by weight of a 50 percent caustic soda solution. The solution thus formed (12,330 parts by weight of $d$ 1.144=10,778 parts by volume) is adjusted with 50 parts by weight of 85 percent formic acid to pH 7 and then treated with 452 parts by weight of iso-octanol ($d$ 0.835=541 parts by volume) in a 30-stage Scheibel column. There is obtained a layer of 12,040 parts by weight of raffinate ($d$ 1.145=10.516 parts by volume) containing 3227 parts by weight of trimethylolpropane (26.7%), 10 parts by weight of iso-octanol (0.1%) and about 1770 parts by weight of salts (14.7%), further 792 parts by weight of an extract layer ($d$ 0.950=824 parts by volume) consisting of 103 parts by weight of trimethylolpropane, 10 parts of water, 237 parts by weight of other organic by-products and less than 0.8 part by weight of inorganic constituents (0.1%).

The iso-octanol is reclaimed from the extract layer by distillation. The raffinate layer is treated with 47,716 parts by weight of iso-octanol ($d$ 0.835=57,838 parts by volume) in a 54-stage column (ratio by volume 1:5.5). Thereby, there is obtained 51,566 parts by weight of an extract containing 3,211 parts by weight of trimethylolpropane and 200 parts by weight of water as well as 8499 parts by weight of raffinate containing 16 parts by weight of trimethylolpropane, 5 parts by weight of iso-octanol and about 1780 parts by weight of salts (21%).

The iso-octanol can be evaporated from the extract solution and the crude trimethylolpropane can then be purified by distillation.

*Example 2*

200 parts by weight of 92 percent butyraldehyde are condensed with 8160 parts by weight of a 30 percent formaldehyde solution in the presence of 2130 parts by weight of a 50 percent caustic soda solution. The solution thus formed (12,290 parts by weight of $d$ 1.144=10,743 parts by volume) is treated with 10,206 parts by weight of cyclohexanol ($d$ 0.950=10,743 parts by volume) in a 30-stage Scheibel column. There is obtained 13,980 parts by weight of an extract layer ($d$ 0.977=14,309 parts by volume) containing 3220 parts by weight of trimethylolpropane (22.5%), 1090 parts by weight of water (7.6%), 30 parts by weight of inorganic constituents (0.2%) and 286 parts by weight of other inorganic by-products (2.1%), further 8516 parts by weight of raffinate ($d$ 1.185=6790 parts by volume) still containing 40 parts by weight of trimethylolpropane (0.5%), further 40 parts by weight of cyclohexanol (0.5%) and about 1490 parts by weight of salts (22%), chiefly sodium formate.

The cyclohexanol is distilled off from the extract solution. 3550 parts by weight of the residue are carefully distilled off in a film evaporator at a pressure of 3 mms. mercury gauge. In the preliminary evaporator there are first removed 105 parts by weight of low-boiling constituents and subsequently 2745 parts by weight of trimethylolpropane (OH-number 1230) are distilled off. In addition there are obtained 700 parts by weight of residue containing 60 percent of trimethylolpropane.

The 700 parts by weight of residue are stirred according to the invention with 7000 parts by weight of raffinate obtained from the first extraction and treated in one step with 35 parts by weight of cyclohexanol. This operation yields 7365 parts by weight of raffinate (aqueous phase, $d$ 1.180) containing 420 parts by weight of trimethylolpropane (5.7% based on raffinate) and 370 parts by weight of extract ($d$ 1.040) containing 255 parts by weight of high-boiling by-products and 33 parts by weight of trimethylolpropane.

The raffinate containing trimethylolpropane can again be treated in a Scheibel column with cyclohexanol or together with a fresh crude condensation solution.

What we claim:

The process of recovering substantially pure trimethylolpropane from the reaction mixture obtained by condensing butyraldehyde and formaldehyde in the presence of an alkaline material and comprising water, trimethylolpropane, organic impurities and salts, said process comprising the steps of (a) mixing said reaction mixture with an alcohol solvent selected from the group consisting of aliphatic, cycloaliphatic and araliphatic monohydric alcohols having 4–8 carbon atoms, in an amount sufficient to obtain a 2 phase system consisting of an aqueous phase containing the above said salts and a major portion of the trimethylolpropane, and a solvent phase containing a major portion of the organic impurities only, (b) separating the aqueous and the solvent phases, (c) mixing the resulting second aqueous phase with a solvent from the said same group in an amount sufficient to obtain a 2 phase system consisting of an aqueous phase containing the salts, and a solvent phase containing substantially pure trimethylolpropane, (d) separating said aqueous phase and said solvent phase and (e) distilling off the solvent of said solvent phase to obtain the trimethylolpropane.

References Cited in the file of this patent

UNITED STATES PATENTS

| | | |
|---|---|---|
| 2,135,063 | Walker et al. | Nov. 1, 1938 |
| 2,479,041 | Elgin | Aug. 16, 1949 |
| 2,806,889 | Gottesman et al. | Sept. 17, 1957 |

FOREIGN PATENTS

| | | |
|---|---|---|
| 108,236 | Australia | Aug. 24, 1939 |
| 1,081,691 | France | June 9, 1954 |